US010150256B2

(12) United States Patent
Martinoni

(10) Patent No.: US 10,150,256 B2
(45) Date of Patent: Dec. 11, 2018

(54) POLYESTER POWDER COMPOSITIONS, METHODS AND ARTICLES

(71) Applicant: 3D Systems, Inc., Rock Hill, SC (US)

(72) Inventor: Raffaele Martinoni, Wolfhausen (CH)

(73) Assignee: 3D Systems, Inc., Rock Hill, SC (US)

( * ) Notice: Subject to any disclaimer, the term of this patent is extended or adjusted under 35 U.S.C. 154(b) by 279 days.

(21) Appl. No.: 15/255,589

(22) Filed: Sep. 2, 2016

(65) Prior Publication Data

US 2016/0369081 A1 Dec. 22, 2016

Related U.S. Application Data

(63) Continuation of application No. 14/089,258, filed on Nov. 25, 2013, now Pat. No. 9,561,625, which is a continuation of application No. 13/450,696, filed on Apr. 19, 2012, now Pat. No. 8,592,519, which is a continuation of application No. 12/644,719, filed on Dec. 22, 2009, now Pat. No. 8,247,492, which is a continuation-in-part of application No. 12/513,266, filed as application No. PCT/US2007/082953 on Oct. 30, 2007, now Pat. No. 9,233,505.

(60) Provisional application No. 60/865,112, filed on Nov. 9, 2006, provisional application No. 61/176,146, filed on May 7, 2009, provisional application No. 61/139,932, filed on Dec. 22, 2008.

(51) Int. Cl.
| | |
|---|---|
| *B29C 67/00* | (2017.01) |
| *C08L 67/02* | (2006.01) |
| *B33Y 10/00* | (2015.01) |
| *B33Y 70/00* | (2015.01) |
| *C08K 3/08* | (2006.01) |
| *C08K 3/34* | (2006.01) |
| *C08K 3/36* | (2006.01) |
| *C08K 9/06* | (2006.01) |
| *B29C 64/153* | (2017.01) |
| *C08K 3/013* | (2018.01) |
| *B29C 35/08* | (2006.01) |
| *B29K 67/00* | (2006.01) |
| *B29K 105/00* | (2006.01) |

(52) U.S. Cl.
CPC ........ *B29C 67/0077* (2013.01); *B29C 64/153* (2017.08); *B33Y 10/00* (2014.12); *B33Y 70/00* (2014.12); *C08K 3/013* (2018.01); *C08K 3/08* (2013.01); *C08K 3/34* (2013.01); *C08K 3/36* (2013.01); *C08K 9/06* (2013.01); *C08L 67/02* (2013.01); *B29C 2035/0838* (2013.01); *B29K 2067/00* (2013.01); *B29K 2105/251* (2013.01); *C08K 2003/0812* (2013.01); *C08K 2201/016* (2013.01); *C08L 2205/025* (2013.01)

(58) Field of Classification Search
CPC ................................. B29C 67/0077

USPC ......................................................... 524/599
See application file for complete search history.

(56) References Cited

U.S. PATENT DOCUMENTS

| | | |
|---|---|---|
| 3,763,109 A | 10/1973 | Witsiepe |
| 3,936,555 A | 2/1976 | Smith, II |
| 3,946,089 A | 3/1976 | Furukawa et al. |
| 4,214,019 A | 7/1980 | Donemeyer et al. |
| 4,217,376 A | 8/1980 | Donemeyer et al. |
| 4,247,508 A | 1/1981 | Housholder |
| 4,252,712 A | 2/1981 | Donemeyer et al. |
| 4,458,039 A | 7/1984 | Eickman |
| 4,480,008 A | 10/1984 | Farranato et al. |
| 4,525,495 A | 6/1985 | Dorman et al. |
| 4,708,839 A | 11/1987 | Bellet et al. |
| 4,764,424 A | 8/1988 | Ganga et al. |
| 4,863,538 A | 9/1989 | Deckard |
| 4,944,817 A | 7/1990 | Deckard |
| 4,985,490 A | 1/1991 | Rosthauser et al. |
| 5,017,753 A | 5/1991 | Deckard |
| 5,156,697 A | 10/1992 | Bourell et al. |
| 5,194,577 A | 3/1993 | Chen |
| 5,218,058 A | 6/1993 | Zeitler et al. |
| 5,247,052 A | 9/1993 | Lucke et al. |
| 5,260,009 A | 11/1993 | Penn |
| 5,304,329 A | 4/1994 | Dickens, Jr. et al. |

(Continued)

FOREIGN PATENT DOCUMENTS

| | | |
|---|---|---|
| DE | 4301543 | 7/1994 |
| DE | 19942071 | 9/1999 |

(Continued)

OTHER PUBLICATIONS

Quarzwerke Gruppe; Product description for Tremin 939® and Tremin® 283; Wollastonite: Reinforcement, low thermal expansion (not dated); Retrieved from the Internet at www.quarzwerke.com/home on Jun. 1, 2010 (2 pages).

(Continued)

*Primary Examiner* — Doris L Lee

(57) ABSTRACT

Powder compositions and articles and methods of forming articles from powder compositions are provided. In one embodiment the powder compositions include at least one polyester polymer powder and an amount of reinforcing particles having an aspect ratio of preferably at least about 5:1. In another embodiment the ponder compositions include at least one medium-high melting temperature, aromatic and crystalline polyester polymer powder. In a preferred embodiment, the powder composition is capable of being formed, via a laser sintering process, into a three-dimensional article that exhibits one or more desirable mechanical properties in an elevated temperature environment.

14 Claims, 3 Drawing Sheets

(56) References Cited

U.S. PATENT DOCUMENTS

| | | | |
|---|---|---|---|
| 5,342,919 A | 8/1994 | Dickens, Jr. et al. | |
| 5,357,040 A | 10/1994 | McGrath et al. | |
| 5,382,308 A | 1/1995 | Bourrell et al. | |
| 5,385,780 A | 1/1995 | Lee | |
| 5,541,277 A | 7/1996 | Muhlfied et al. | |
| 5,733,497 A | 3/1998 | McAlea et al. | |
| 5,747,560 A | 5/1998 | Christiani et al. | |
| 5,910,558 A | 6/1999 | Schoenherr et al. | |
| 6,110,411 A | 8/2000 | Clausen et al. | |
| 6,184,282 B1 | 2/2001 | Gareis et al. | |
| 6,245,281 B1 | 6/2001 | Scholten et al. | |
| 6,362,269 B1 | 3/2002 | Ishihata et al. | |
| 6,531,086 B1 | 3/2003 | Larsson | |
| 6,713,125 B1 | 3/2004 | Sherwood et al. | |
| 6,716,952 B1* | 4/2004 | Matsumoto | C08G 77/56 525/101 |
| 6,740,698 B2 | 5/2004 | Akkapeddi et al. | |
| 6,814,926 B2 | 11/2004 | Geving et al. | |
| 6,932,610 B2 | 8/2005 | Ono et al. | |
| 6,953,815 B2 | 10/2005 | Enomoto et al. | |
| 6,984,377 B2 | 1/2006 | Witham et al. | |
| RE39,354 E | 10/2006 | Dickens et al. | |
| 7,148,286 B2 | 12/2006 | Baumann et al. | |
| 7,211,615 B2 | 5/2007 | Baumann et al. | |
| 7,261,542 B2 | 8/2007 | Hickerson et al. | |
| 7,312,269 B2 | 12/2007 | Cevolini | |
| 7,455,804 B2 | 11/2008 | Patel et al. | |
| 7,767,132 B2 | 8/2010 | Patel et al. | |
| 8,114,334 B2 | 2/2012 | Martinoni et al. | |
| 8,263,697 B2 | 9/2012 | Miyoshi et al. | |
| 2001/0036516 A1 | 11/2001 | Schmidt | |
| 2001/0050031 A1 | 12/2001 | Bredt et al. | |
| 2002/0053257 A1 | 5/2002 | Brice et al. | |
| 2002/0149137 A1 | 10/2002 | Jang et al. | |
| 2003/0186042 A1 | 10/2003 | Dunlap et al. | |
| 2004/0018202 A1 | 1/2004 | Adair | |
| 2004/0166349 A1 | 8/2004 | Haaland | |
| 2004/0175686 A1* | 9/2004 | Ono | A61L 27/443 434/274 |
| 2004/0192859 A1 | 9/2004 | Parker et al. | |
| 2004/0204531 A1 | 10/2004 | Baumann et al. | |
| 2004/0226405 A1 | 11/2004 | Geving et al. | |
| 2004/0232583 A1 | 11/2004 | Monsheimer et al. | |
| 2005/0003189 A1 | 1/2005 | Bredt et al. | |
| 2005/0027098 A1 | 2/2005 | Hayes | |
| 2005/0197446 A1 | 9/2005 | Loyen et al. | |
| 2005/0207931 A1 | 9/2005 | Hesse et al. | |
| 2006/0036012 A1 | 2/2006 | Hayes et al. | |
| 2006/0041041 A1 | 2/2006 | Douais et al. | |
| 2006/0052508 A1 | 3/2006 | Cevolini | |
| 2006/0189784 A1 | 8/2006 | Monsheimer | |
| 2007/0045891 A1 | 3/2007 | Martinoni et al. | |
| 2007/0065635 A1 | 3/2007 | Sauer | |
| 2007/0126159 A1 | 6/2007 | Simon et al. | |
| 2007/0132158 A1 | 6/2007 | Marinoni et al. | |
| 2007/0267766 A1 | 11/2007 | Hesse et al. | |

FOREIGN PATENT DOCUMENTS

| | | |
|---|---|---|
| DE | 19927923 | 7/2000 |
| DE | 10055465 | 5/2002 |
| DE | 10129305 | 12/2002 |
| EP | 0026806 | 4/1981 |
| EP | 0196972 | 10/1986 |
| EP | 1443073 | 10/1986 |
| EP | 0392285 | 10/1990 |
| EP | 0399272 | 11/1990 |
| EP | 0413258 | 2/1991 |
| EP | 0911142 | 4/1999 |
| EP | 1604808 | 12/2005 |
| EP | 1634693 | 3/2006 |
| EP | 1571173 | 9/2006 |
| FR | 1524016 | 5/1968 |
| FR | 2873380 | 1/2006 |
| GB | 1147052 | 4/1969 |
| GB | 2373747 | 10/2002 |
| JP | 09-291210 | 11/1997 |
| JP | H10-505116 | 5/1998 |
| JP | 2003221493 | 8/2003 |
| WO | 9606881 | 3/1996 |
| WO | 9617003 | 6/1996 |
| WO | 9630195 | 10/1996 |
| WO | 0058389 | 10/2000 |
| WO | 2004113042 | 12/2004 |
| WO | 2005025389 | 3/2005 |
| WO | 2005025839 | 3/2005 |
| WO | 2008/057844 | 5/2008 |

OTHER PUBLICATIONS

Cuillo, Peter A., et al; Wollastonite A. Versatile Functional Filler; pcimag.com; Posted Nov. 1, 2002 (7 pages).

Cheng, Stephen et al., "Thermal analysis of poly(butylene terephthalate) for heat capacty, rigid-amorphous content, and transition behavior, " Macromolecular Chemistry and Physics, vol. 189, Issue 10: 2219-2512 (1988) (16 pages).

Singh, et al., "Polyester Moulding Compounds of Natural Fibres and Wollastonite", Journal Article, Central Building Research Institute, Roorkee 247 667, India, 9 pages (Sep. 17, 2003).

International Search Report for PCT/US2007/082953, 4 pages (dated Jul. 2, 2008).

Written Opinion for PCT/US2007/082953, 8 pages (dated Jul. 2, 2008).

Brochure commerical "Duraform PA ET GF, Materiaux pour systemes SLS," 2001 (2 pages).

"3D Systems:""A thermoplastic elastomer with excellent durability, resistance to heat and chemicals, and long-term stability""Internet Article, [Online] Jun. 1, 2005, XP002413454Retrieved from the Internet: URL:http://www.3dsystems.com/products/datafiles/lasersintering/datasheets/DS-DuraForm_Flex_plastic.pdf".

"3D Systems:""Materialbezeichnung : DuraForm FlexSeal Transflussigkeit""Datenblatt Zur Materialsicherheit, [Online] Mar. 8, 2005 (Mar. 8, 2005), XP002413455Retrieved from the Internet: URL:http://www.3dsystems.com/products/datafiles/lasersintering/msds/DuraForm_Flex?24130-S12-00-A, SDS,EU,FlexSeal,BLK-YLW-NTL_german.pdf [retrieved on Jan. 8, 2007] Issued Aug. 3, 2005 (5 pages)".

Advantage 357 Defoamer for Water-Based Paint Systems Product Data Sheet; Hercules, Copyright 1999 by Hercules Incorporated; pp. 1-2.

"Anonymous:""DTM Releases Infiltration for use with DSM Somos""The Auto Channel News Bulletin, [Online] Apr. 8, 1999 (Apr. 8, 1999), XP002413452Retrieved from the Internet: URL. www.theautochannel.com/news/press/date/19990407/press021449.html[retrieved on Jan. 5, 2007] (2 pages)".

DuPont™ Hytrek® thermoplastic polyester elastomer product guide and properties (15 pages).

Getahindus (M) Sdn. Bhd. Product Range of natural rubber latex products. Retrieved on Jun. 6, 2005 from http://www.getahindus.com/my/product.htm, pp. 1-3.

Givul LAN 2056 Product Data Sheet, pp. 1-2; Material Safety Data Sheet, pp. 1-4; Getahindus (M) SDN BHD.

Givul LP2 Product Data Sheet, Getahindus (M) SDN BHD, pp. 1-2.

Givul MR Product Data Sheet, pp. 1-3; Material Safety Data Shet, pp. 1-4; Getahindus (M) SDN BHD.

Loprotex LPX Product Data Sheet, pp. 1-3; Material Safety Data Sheet, pp. 1-4; Getahindus (M) SDN BHD.

"Protcam:""Somos 201 and Somos 201 infiltrated properties""Internet Article—Datasheet, [Online] Feb. 4, 2005 (Feb. 4, 2005), XP002413453Retrieved from the Internet: URL:http://vvww.protocam/pdf/Somos201.pdf [Retrieved on Jan. 4, 2007] 1 page)".

Duroplastic Articles, "Guide to Fillers," obtained from the internet at http://www.duroplastic.com/pdf/articles/arts/GuideToFillers.pdf (2 pages).

English-language translation of the opposition brief filed by Opponent 1 (Evonik Degussa) against EP2087031, dated Jun. 20, 2012 (13 pages).

(56) References Cited

OTHER PUBLICATIONS

English-language translation of the opposition brief filed by Opponent 2 (EOS GmbH) against EP2087031, dated Jun. 20, 2012.
European Patent Office opinion of opposition of EP2087031 dated Jan. 22, 2014 (8 pages).
Exerpt from Rompp "Chemie Lexikon", vol. 2, 9th Edition, Gerog Thieme publishing house 1990 (2 pages).
Pfister, Neue Materialen fur das selektive Laserintern (New materials for selective laser sintering), dissertation Sep. 2005 (7 pages).
Written Submission of the patent proprietor regarding the opposition filed against EP2087031, dated Oct. 20, 2014 (41 pages).
ChemYQ (http://www.chemyq.com/EN/xz/xz3/23021imdhp.htm), 2015.
Ullmann's Encyclopedia of Industrial Chemistry, paragraph bridging the two columns.
R.D. Cadle, "Particle Size Determination", Interscience Publishers, Inc., 1955, pp. 52 et seqq.
"Fiber", http://en/wikipedia.org/wiki/Fiber.
"Appendix B to Section 191.1001, Detailed Procedures for Asbestos Sampling and Analysis, Non Mandatory. Occupational Safety & Health Administration; http://www.osha.gov/pls/oshaweb.show_documents?P_table=Standards©p_id=9997".
Reply of the patent proprietor to the notice(s) of opposition filed against EP2087031, dated Apr. 12, 2013.
Wypych, George, Handbook of Fillers, 2nd Edition. Toronto, ChemTec Publishing, 2000, p. 167. TP1114.W.96.
Japanese Translation of Japanese Office Action dated Aug. 3, 2015 (5 pages).

\* cited by examiner

POLYESTER POWDER COMPOSITIONS, METHODS AND ARTICLES

CROSS REFERENCE TO RELATED APPLICATIONS

This application is a continuation of U.S. application Ser. No. 14/089,258 filed Nov. 25, 2013, which is a continuation of U.S. application Ser. No. 13/450,696 filed on Apr. 19, 2012 (now U.S. Pat. No. 8,592,519), which is a continuation of U.S. application Ser. No. 12/644,719 filed on Dec. 22, 2009 (now U.S. Pat. No. 8,247,492). U.S. application Ser. No. 12/644,719 claims priority to U.S. Provisional Application Ser. No. 61/176,146 filed May 7, 2009 and entitled "POLYESTER POWDER COMPOSITIONS, METHODS AND ARTICLES", and to U.S. Provisional Application Ser. No. 61/139,932 filed Dec. 22, 2008 and entitled "POLYESTER POWDER COMPOSITIONS, METHODS AND ARTICLES"; and is a continuation-in-part of U.S. patent application Ser. No. 12/513,266 filed May 1, 2009 and entitled "POWDER COMPOSITIONS AND METHODS OF MANUFACTURING ARTICLES THEREFROM" (now U.S. Pat. No. 9,233,505), which is a 35 U.S.C. § 371 application of International Application Serial No. PCT/US2007/082953 filed Oct. 30, 2007 and entitled "POWDER COMPOSITIONS AND METHODS OF MANUFACTURING ARTICLES THEREFROM", which in turn claimed priority to U.S. Provisional Application Ser. No. 60/865,112 filed Nov. 9, 2006 and entitled "POWDER COMPOSITIONS AND METHODS OF MANUFACTURING ARTICLES THEREFROM", each of which is incorporated herein by reference in its entirety.

TECHNICAL FIELD

This invention relates to powder compositions and methods of manufacturing articles from powder compositions.

BACKGROUND

Laser sintering ("LS"), also termed selective laser sintering, is a process whereby a dispenser deposits a layer of powdered material into a target area. A laser control mechanism, which typically includes a computer that houses the design of a desired article, modulates and moves a laser beam to selectively irradiate the powder layer within the defined boundaries of the design, resulting in melting of the powder on which the laser beam falls. The control mechanism operates the laser to selectively sinter sequential powder layers, eventually producing a completed article comprising a plurality of layers sintered together. A detailed description of LS technology can be found in U.S. Pat. Nos. 4,247,508, 4,863,538, 5,017,753, and 6,110,411, each incorporated herein by reference.

LS technology has enabled the direct manufacture of three-dimensional articles well suited to rapid prototyping and various other applications. Conventional powdered materials for use in LS have typically suffered from one or more drawbacks such as, for example, cost, ease of use in conventional LS machines, recyclability, and shrinkage problems when exposed to high process temperatures. Moreover, articles produced from conventional polymer powders via LS processes typically exhibit inferior mechanical properties relative to articles produced by more conventional manufacturing processes (e.g., injection molding). In addition, such articles are generally not suitable for use in elevated temperature environments due to degradation of mechanical properties.

Carbon fibers and glass fibers have been considered as filler materials to improve the mechanical properties of LS articles. Carbon fibers, however, are relatively expensive, may require careful handling to minimize or avoid particle inhalation issues (due to the particle size and bulk density typically associated with carbon fibers), can be difficult to process in LS equipment due to its black coloration and the additional infrared absorption associated therewith, and may not be suitable for producing white, light-colored and/or bright articles. As for glass fibers, they are relatively expensive and may be difficult to obtain in predictable commercial quantities of consistent and suitable quality.

Thus, there is a continuing need for improved powder compositions for use in producing LS articles that are cost effective, easy to use, and/or exhibit suitable mechanical properties at desired end use temperatures.

SUMMARY

The present invention provides powder compositions that are preferably useful in sintering applications such as, for example, laser sintering. The powder compositions preferably include at least one polyester polymer powder.

In one embodiment, the present invention provides a powder composition that includes at least one polyester polymer powder that is preferably laser-sinterable and reinforcing panicles preferably having an aspect ratio of at least about 5:1 and a maximum dimension of less than about 300 microns. The reinforcing particles preferably comprise at least about 3 weight percent ("wt-%") of the powder composition, based on the total weight to the powder composition. Preferably, the reinforcing particles include mineral particles that comprise at least about 1 wt-% of the powder composition, based on the total weight of the powder composition.

In another embodiment, the present invention provides a laser-sinterable powder composition that includes at least one medium-high melting temperature, high elastic modulus, preferably aromatic, and at least semi-crystalline polyester polymer powder. The powder composition may further comprise other suitable polymers (e.g., amorphous or aliphatic polyesters) or fillers (e.g., reinforcing particles).

In yet another embodiment, the present invention provides a laser-sinterable powder composition that includes at least one semi-crystalline or crystalline aromatic polyester polymers having a melting temperature of between 120 and 220° C.

In yet another embodiment, the present invention provides a laser-sinterable powder composition that includes at least one semi-crystalline or crystalline laser-sinterable polyester polymers having a melting temperature of between 150 and 220° C.

In yet another embodiment, the present invention provides a laser-sinterable powder composition that includes a blend of two or more polyester polymers. The blend may include, for example, (i) one or more polyester polymers that is semi-crystalline or crystalline and (ii) one or more amorphous polyester polymers. Alternatively, the blend may include, for example, two or more semi-crystalline or crystalline polyester polymers (with or without one or more amorphous polyester polymers).

In yet another embodiment, the present invention provides a method for sintering powder compositions described herein to form a three-dimensional article. LS is a preferred sintering method for forming such articles, although it is contemplated that other sintering methods may also be used.

In yet another embodiment, the present invention provides a three-dimensional article that includes a plurality of sintered layers that include a polymer matrix and optional reinforcing particles dispersed throughout the polymer matrix as described herein. In a preferred embodiment, the reinforcing particles have an aspect ratio of at least about 5:1 and a maximum dimension of less than about 300 microns. Preferably, the reinforcing particles comprise at least about 3 wt-% of the plurality of sintered layers, based on the total weight of the plurality of sintered layers, and include mineral panicles that comprise at least about 1 wt-% of the plurality of sintered layers, based on the total weight of the plurality of sintered layers.

In yet another embodiment, the present invention includes a method for forming a mold. The method includes providing a powder composition including a polyester polymer powder as described herein. The powder composition is laser sintered to form a mold that is preferably capable of forming a molded product from a material having a temperature of greater than about 130° C.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and drawings, and from the claims.

SELECTED DEFINITIONS

Unless otherwise specified, the following terms used in this specification have the meanings provided below.

The term "aspect ratio" describes the degree to which the overall three-dimensional shape of a particle generally deviates from a compact three-dimensional shape (e.g., a spherical or cube-like shape). The aspect ratio of a given particle or population of particles is expressed as a ratio of length: width. A particle having a large aspect ratio is generally long and narrow, while a particle having an aspect ratio near 1 is generally compact. By definition, a particle cannot have an aspect ratio less than 1.

FIG. 1 shows a generic representative particle P having parallel square faces 10 and 12, whereby face 10 has a larger surface area than face 12. As illustrated graphically in FIG. 1, the "length" component of the aspect ratio of particle P is a maximum dimension L of particle P as taken along a major axis A1. The "width" component of the aspect ratio represents a maximum crosswise dimension W of particle P that lies within a plane (or cross-section) located perpendicular to the major axis A1. As shown in FIG. 1, maximum crosswise dimension W is taken along minor axis A2 of the plane defined by minor axes A2 and A3. Processes for measuring aspect ratios of particles are known in the art. A description of one such representative process is found in U.S. Pat. No. 6,984,377.

The term "heat deflection temperature" (hereinafter "HDT") generally refers to the temperature at which a LS test specimen deflects by a specified distance when subjected to a specified load at a specified rate of temperature increase. More specifically, the term "HDT" refers to the temperature of deflection under load ("Tf") for a LS test specimen as determined using Method A of International Standard Organization International Standard 75-2, Second edition, 2004 May 15 (hereinafter "ISO 75-2:2004").

The term "LS article" refers to a three-dimensional article produced from a composition using a laser-sintering process.

The term "maximum dimension" refers to the longest linear dimension (or diameter) of a particle taken along the major axis of the particle. See maximum dimension L of FIG. 1, for example.

The term "maximum crosswise dimension" refers to the longest linear dimension (or diameter) of a particle that resides within any plane of the particle located perpendicular to the maximum dimension. See maximum crosswise dimension W of FIG. 1, for example. Further, for example, assuming the maximum crosswise distance of a particle lies within: (a) an elliptical cross-section, then the maximum crosswise dimension passes through the two foci of the elliptical cross-section; (b) a rectangular cross-section, then the maximum crosswise direction corresponds to a hypotenuse of the rectangular cross-section; and (c) a circular cross-section, than the maximum crosswise dimension is equal to the diameter of the circular cross-section.

The term "mineral" refers to any of the genus of naturally occurring inorganic substances (including fossilized organic substances) that typically have a definite chemical composition and a characteristic crystalline structure, color, or hardness. The term encompasses both purified minerals and synthetically produced equivalents of naturally occurring minerals.

The term "reinforcing particle" refers to types of particles that, when included in suitable amounts in a three-dimensional article, improve one or mote mechanical properties of the article (e.g., tensile strength, elongation at break, modulus, heat deflection temperature, etc.).

The term "test specimen" and "LS test specimen", when used in the context of HDT, refer to bars produced by suitable LS processes and having the preferred dimensions specified in ISO 75-2:2004 (i.e., 80×10×4 millimeters (length×width×thickness)). The sintered layers of the test specimens are oriented in the flatwise planar direction (i.e., parallel to a plane defined by the width and length of the test specimen).

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

Figure 1:
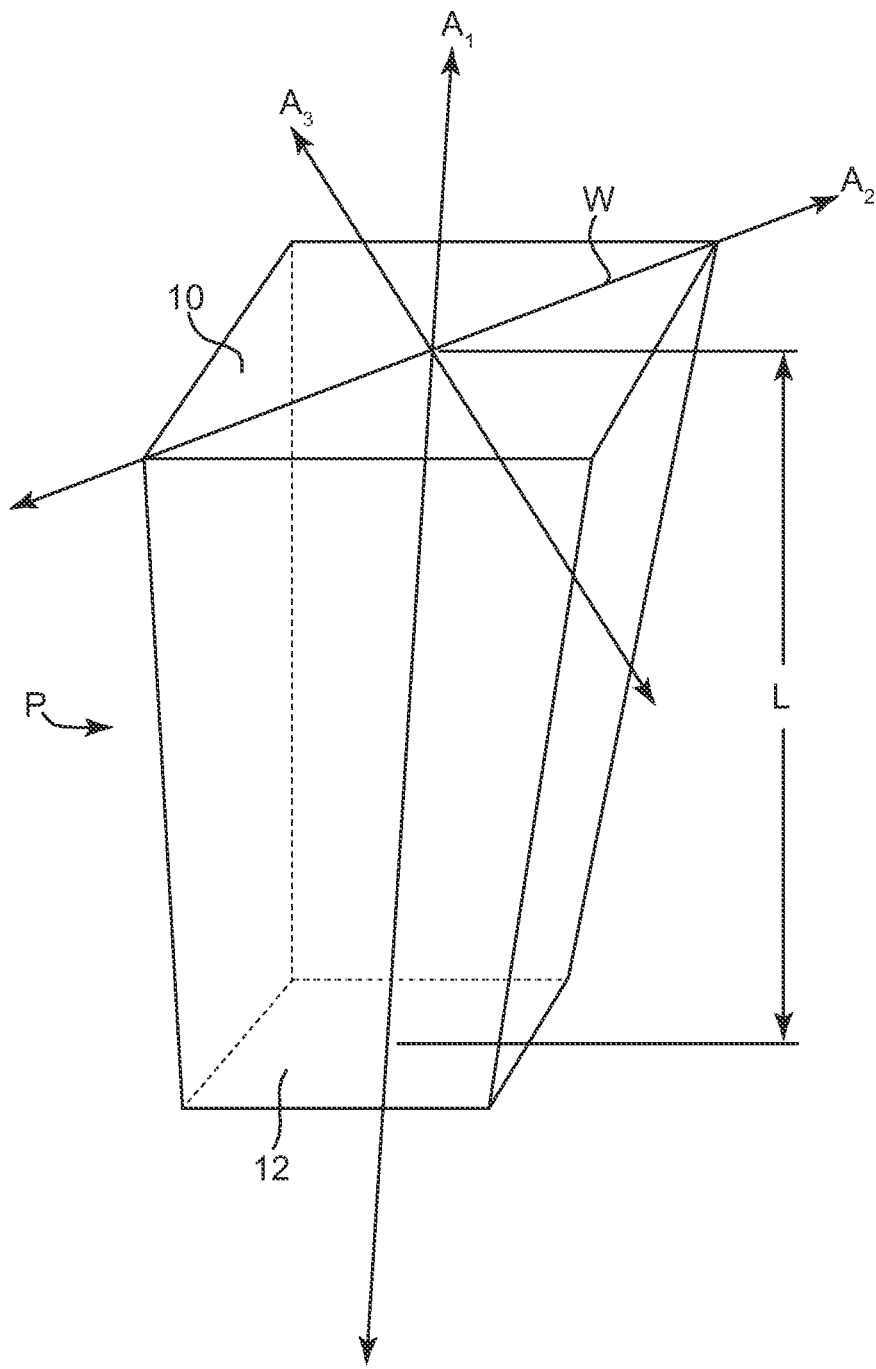
FIG. 1 is a perspective view of a generic particle provided to illustrate determination of the aspect ratio of the particle.

In one embodiment, the present invention provides a powder composition that includes (a) an amount of reinforcing particles preferably having an aspect ratio of at least about 5:1 and a maximum dimension of less than about 300 microns, and (b) at least one polyester polymer powder that is preferably laser sinterable. When reinforcing particles are used, the powder composition preferably includes an amount of the reinforcing particles suitable to enhance one or more mechanical properties of an article formed therefrom. Preferably, at least some of the reinforcing particles are mineral particles. In another embodiment the present invention provides a laser-sinterable powder composition that includes at least one medium-high melting temperature, high elastic modulus, preferably aromatic, and at least semi-crystalline polyester polymer powder. The powder composition of this embodiment may further comprise other optional suitable polymers (e.g., amorphous or aliphatic polyesters) or optional fillers. Methods for making and using such powders are also provided The powder composition of the present invention may be useful in the production of a variety of articles, including, for example, LS articles that preferably exhibit one or more enhanced mechanical properties at ambient and/or elevated temperatures.

A laser-sinterable polymer powder is a polymer powder that is capable of being sintered in an LS machine to form a three-dimensional article. A laser-sinterable polymer powder is preferably capable of (1) being uniformly applied to a build surface of an LS machine, (2) being at least substantially melted by a laser beam of the LS machine to form a first layer (either in the presence or absence of one or more additional materials), and (3) forming a second overlying layer adhered to the first layer. Thus, for example, to be useful in current LS machines, a powder composition is preferably sufficiently flowable in powder form (e.g., from a feed bed onto a part-forming bed) to form a thin even powder layer that is capable of being selectively sintered and exhibits a melting temperature within the LS machine parameters.

Moreover, for a powder composition to be considered laser-sinterable, it is typically also capable of forming a sintered article that possesses at least a minimal amount of mechanical and aesthetic properties. For example, the sintered article should be capable of being handled under normal circumstances without being damaged. In addition, a laser-sinterable powder composition is preferably capable of forming an LS article having a surface with sufficient resolution that is preferably substantially smooth and preferably exhibits no more than minimal orange peel. The term "orange peel" is generally used to refer to the presence of surface defects on an LS article such as unsuitable roughness, or pitting or distortion problems, which negatively affect the appearance or function of the article.

In addition, a laser-sinterable powder composition preferably does not exhibit unsuitable processing characteristics such as, for example, curl or fuming. As used herein, the term "curl" refers to the distortion of an LS article resulting from phase changes during the sintering process, which can cause curling of one or more portions of a sintered layer (typically out of a horizontal plane) during part production. The term "fuming" refers to the emission of volatiles during part formation, which may condense, for example, on a surface of the sintering machine or a powder bed therein.

Preferred powder compositions of the invention do not exhibit unsuitable curl, orange peel, or fuming when laser sintered into parts.

Figure 2A:
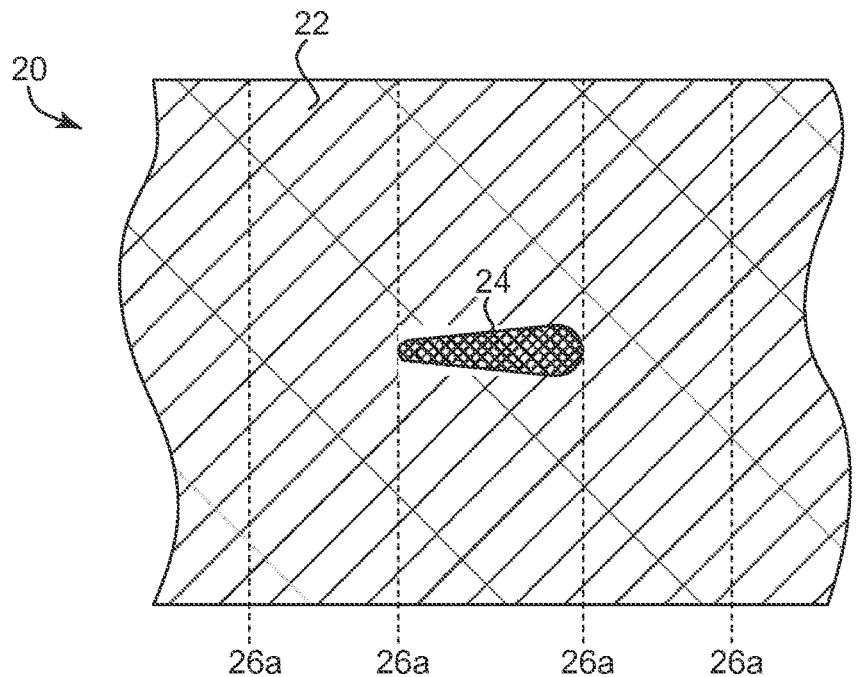
FIG. 2A is a schematic cross-sectional view of a portion of an article containing reinforcing particles.
Figure 2B:
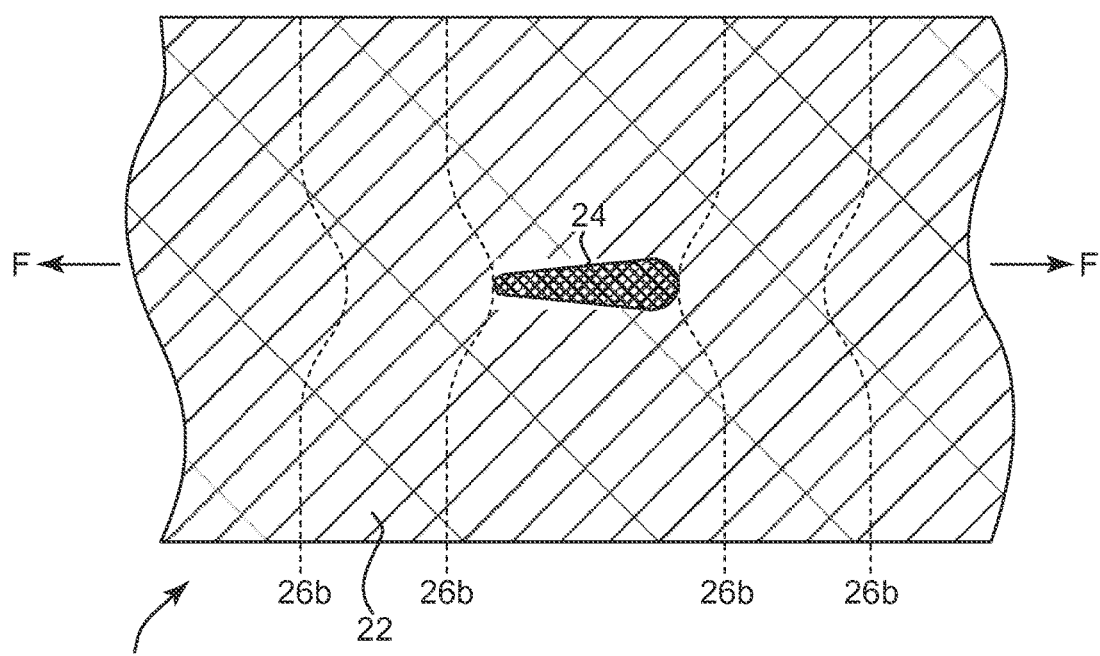
FIG. 2B is a schematic cross-sectional view of the article portion of FIG. 2A, when subjected to a tensile load.

FIGS. 2A and 2B illustrate how, in some embodiments, a physical property of the reinforcing particles may enhance one or more mechanical properties of an article containing the reinforcing particles FIGS. 2A and 2B are schematic cross-sectional views of a portion of an article 20 ("article portion 20") and are not drawn to scale. Article portion 20 includes polymer matrix 22 and reinforcing particles 24 dispensed throughout polymer matrix 22. For purposes of illustration, a single reinforcing particle 24 is shown. Reference lines 26a, which are spaced equidistant from one another in FIG. 2A, are included for purposes of illustrating polymer matrix 22 when in a non-deformed state.

As shown in FIG. 2B, upon application of tensile load F to article portion 20, polymer matrix 22 deforms longitudinally. The deformation of polymer matrix 22 is illustrated by deformed reference lines 26b—portions of which are shifted longitudinally relative to reference lines 26a of FIG. 2A. While not intending to be bound by theory, reinforcing particle 24 is thought to cause an overall reduction in the amount of strain within polymer matrix 22 due to reinforcing particle 24 being preferably more stiff than polymeric matrix 22. This strain reduction is especially prevalent in portions of polymer matrix 22 located near reinforcing particle 24, as evidenced by the curvature of deformed reference lines 26b.

In certain preferred embodiments, LS test specimens formed from powder compositions of the present invention exhibit an HDT that is greater than that of LS test specimens formed in the same manner from identical powder compositions lacking a suitable amount of suitable reinforcing particles. In such embodiments, LS test specimens formed from powder compositions of the present invention preferably exhibit an HDT that is at least about 10° C. higher than that of LS lest specimens formed from powder compositions that do not contain the reinforcing particles but are otherwise identical. In certain preferred embodiments, LS test specimens formed from powder compositions of the present invention exhibit an HDT of at least about 70° C., more preferably at least about 90° C., and even more preferably at least about 110° C.

Powder compositions of the present invention may be used to form a variety of articles for use in a variety of applications, including, for example, rapid prototyping and rapid manufacturing. Some examples of rapid manufacturing applications include small production run products (e.g., where production by means of an injection mold is not economical or technically feasible) such as, for example, parts for high-specification cars of which only small numbers are produced, replacement parts for motorsports or aerospace industries, and high-specification fashion items such as spectacle frames; and production of similar but individual components manufactured in relatively large numbers such as, for example, hearing aid components. Examples of industrial sectors that may benefit from articles of the invention include the aerospace industry, medical technology, mechanical engineering, automobile construction, the sports industry, the household goods industry, the electrical industry, the packaging industry, and lifestyle products.

In some embodiments, powder compositions of the present invention are capable of forming LS articles that can withstand elevated temperature environments while still exhibiting one or more suitable mechanical properties. Examples of LS articles that may require such properties include automotive parts (e.g., engine parts and other parts in close proximity to an engine); fuel system parts; household appliance parts that require heat resistance (e.g., dishwasher parts and oven parts); molds for forming molded articles from heated materials; hydraulic parts for contacting heated liquids; intake manifolds (e.g., hot air intakes and aspiration ducts); lighting system parts; and parts or articles in other applications that may be required to perform in elevated temperature environments (e.g., aerospace, motorsport, design, electronics, industrial, and packaging applications).

Powder compositions of the present invention may include optional reinforcing particles having any of a variety of aspect ratios suitable to achieve the desired mechanical properties. While not intending to be bound by theory, particles having a suitably high aspect ratio are thought to increase the HDT of certain LS articles. In certain preferred embodiments, powder compositions of the present invention include a suitable amount of reinforcing particles having an aspect ratio of at least about 5:1, more preferably at least about 10:1, even more preferably at least about 15:1, and optimally at least about 20:1. Preferably, the reinforcing particles have an aspect ratio of less than about 200:1, more preferably less than about 100:1, and even more preferably less than about 75:1. If desired, the powder compositions may also include amounts of particles (e.g., as filler) having aspect ratios other than those specified above.

The powder composition of the present invention may include reinforcing particles having any suitable regular or irregular three-dimensional shape, preferably so long as the particles exhibit a suitable aspect ratio. Examples of suitable particle shapes may include acicular, bladed, columnar, equant, fiber, fibril, fibrous, and prismatic and the like. In a preferred embodiment, at least some of the reinforcing particles are acicular. The reinforcing particles may be solid, or substantially solid, in nature or may contain one or more voids.

To be useful in LS applications, reinforcing particles preferably do not melt, or soften to an unsuitable degree, either during the LS process or at the maximum temperature in which LS articles containing the reinforcing particles are expected to perform. As such, to avoid melting of the reinforcing particles during LS processes, reinforcing particles should preferably possess a melting temperature (or degradation temperature) greater than that of the laser-sinterable polymer powder. In preferred embodiments, the reinforcing particles preferably have a melting temperature (or degradation temperature) of greater than about 200° C., more preferably greater than about 500° C., and even more preferably greater than about 1,000° C. In some embodiments, incorporation of reinforcing particles having such melting temperatures may enhance the flame retardancy of resulting LS articles.

Powder compositions of the present invention may include any amount of reinforcing particles sufficient to achieve the desired mechanical properties. In some embodiments, the powder compositions may not contain reinforcing particles and the properties of the unfilled polymer are sufficient for the desired end use. However, in general, the addition of reinforcing particles as described herein may be particularly advantageous. Preferably, the powder compositions include at least about 5 wt-%, more preferably at least about 10 wt-%, and even more preferably at least about 15 wt-% of reinforcing particles, based on the total weight of the powder composition. In preferred embodiments, the powder compositions includes less than about 80 wt-%, more preferably less than about 50 wt-%, and even more preferably less than about 30 wt-% of reinforcing panicles, based on the total weight of the powder compositions.

Powder compositions of the present invention may include reinforcing particles of any suitable size sufficient to achieve the desired mechanical properties. To enable efficient processing of powder compositions in LS machines, the reinforcing particles preferably have a maximum dimension of less than about 300 microns, more preferably less than about 250 microns, and even more preferably less than about 200 microns. To provide the desired mechanical properties, the reinforcing particles preferably have a maximum dimension that is greater than about 10 microns, more preferably greater than about 50 microns, and even more preferably greater that about 80 microns.

In some embodiments, the median or average maximum dimension of the total amount of reinforcing particles is preferably less than about 300 microns, more preferably less than about 250 microns, and even more preferably less than about 200 microns. In some embodiments, the median or average maximum dimension of the total amount of reinforcing particles is greater than about 10 microns, more preferably greater than about 50 microns, and even more preferably greater that about 80 microns.

If desired, powder compositions of the present invention may also include amounts of particles having maximum dimensions other than those specified above.

The reinforcing particles may exhibit any suitable maximum crosswise dimension to achieve the desired mechanical properties. In preferred embodiments, the reinforcing particles exhibit a maximum crosswise dimension of less than about 100 microns, more preferably less than about 80 microns, and even more preferably less than about 50 microns. Preferably, the reinforcing particles exhibit a maximum crosswise dimension that is greater than about 3 microns, more preferably greater than about 10 microns, and even more preferably greater than about 15 microns.

In some embodiments, the median or average maximum crosswise dimension of the total amount of reinforcing particles is less than about 100 microns, more preferably less than about 80 microns, and even more preferably less than about 50 microns. In some embodiments, the median or average maximum crosswise dimension of the total amount of reinforcing particles is greater than about 3 microns, more preferably greater than about 10 microns, and even more preferably greater than about 15 microns.

If desired, powder compositions of the present invention may also include amounts of particles having maximum crosswise dimensions other than those specified above.

Reinforcing particles suitable to produce LS articles having the desired mechanical properties may be formed from any suitable material. Examples of suitable reinforcing particles may include the following types of particles (preferably when in a particle form having a suitable aspect ratio, maximum dimension, and/or maximum crosswise dimension): inorganic particles such as boron particles, ceramic particles, glass particles (e.g., glass fibers), and mineral particles; organic particles such as carbon particles (e.g., carbon-fiber particles or carbon nanotubes) and polymeric particles (e.g., polyester particles, polyamide particles—including aramid particles such as KEVLAR fibers, and polyvinyl alcohol particles); particles containing both organic and inorganic constituents; and mixtures thereof. For reasons discussed further below, preferably at least some (and in some embodiments all or substantially all) of the reinforcing particles are mineral particles.

Certain reinforcing particles (e.g., asbestos) that may achieve the desired mechanical properties may pose a human health risk. Such reinforcing particles may be used under certain circumstances; however, powder compositions of the present invention preferably include reinforcing particles that do not pose a health risk to handlers of either the powder composition or articles formed therefrom. Preferably, the reinforcing particles exhibit physical properties (e.g., particle sizes and/or bulk densities) that avoid or minimize (1) the dusting of unsuitable quantities of particles into the air during the manufacture of powder compositions or subsequent articles formed therefrom, and/or (2) the time in which the particles, once airborne, remain suspended in the air.

As discussed above, in some embodiments, powder compositions of the present invention preferably include an amount of reinforcing particles having at least some mineral particles. Mineral particles such as, for example, wollastonite are inexpensive and readily available on the commercial market in bulk quantities that are of consistent and suitable quality (unlike, e.g., certain glass fibers). As such, mineral particles may be included in powder compositions of the present invention to reduce or eliminate the use of higher cost particles (e.g., carbon and glass fibers). In addition, mineral particles such as, for example, wollastonite are available in white and other light-colored forms, which allows articles to be produced having aesthetic characteristics that may not be possible using similar amounts of other particles such as, for example, carbon fibers. Such aesthetic characteristics may allow for the production of articles having a white, light-colored, and or bright appearance. Furthermore, the coloration of certain mineral particles can be beneficial to efficient LS processing (unlike, e.g., the dark color of carbon fibers, which as discussed in the Background section, may result in the absorption of unsuitable amounts of infrared energy that can interfere with LS processes).

Powder compositions of certain embodiment of the present invention preferably include at least some mineral reinforcing particles. In preferred embodiments, mineral reinforcing particles are present in the powder composition of the present invention in an amount of at least about 1 wt-%. more preferably at least about 2 wt-%. even more preferably at least about 3 wt-%, and optimally at least about 5 wt-%, based on the total weight of the powder composition. Preferably, the mineral reinforcing particles are present in the powder composition in an amount of less than about 80 wt-%, more preferably less than about 50 wt-%, and even more preferably less than about 40 wt-%, based on the total weight of the powder composition. In some embodiments, the mineral reinforcing particles constitute at least about 10 wt-%, more preferably at least about 25 wt-%, even more preferably at least about 50 wt-%, and optimally at least about 75 wt-% of the total amount of reinforcing particles included in the powder composition.

Certain milling procedures used to produce suitably sized mineral particles may result in particles having unsuitable aspect ratios for purposes of producing LS articles having the desired mechanical properties. To provide mineral particles having suitable aspect ratios, the mineral particles are preferably produced using milling techniques or other suitable techniques that are not overly harsh. Examples of minerals from which mineral particles having suitable aspect ratios may be produced include silicate minerals (e.g., calcium silicates), calcium minerals (e.g., calcium carbonates), barium minerals (e.g., barium sulphates), magnesium minerals (e.g., magnesium hydroxides), and mixtures thereof.

In a preferred embodiment, the mineral particles are silicate minerals that have been suitably processed. Examples of silicate minerals from which suitable reinforcing particles may be produced include ferrobustamite, $Ca(Fe^{2+},Ca,Mn^{2+})[Si_2O_6]$; bustamite, $(Mn^{2+},Ca)[SiO_3]$; vistepite, $Mn_5SnB_2Si_5O_{20}$; cascandite, $Ca(Sc,Fe^{3+})[HSi_3O_9]$; pectolite, $NaCa_2[HSi_3O_9]$; denisovite, $Ca_2(K,Na)Si_3O_8(F,OH)_2$; sérandite, $Na(Mn^{2+},Ca)_2[HSi_3O_9]$; foshagite, $Ca_4[(OH)_2|Si_3O_9]$; hillebrandite, $Ca_2[(OH)_2|SiO_3]$; wollastonite, $CaSiO_3$ (e.g., wollastonite-7T, wollastonite-2M, etc.); rankinite, $Ca_3Si_2O_7$; kilchoanite, $Ca_3Si_2O_7$; larnite, $Ca_2SiO_4$; bredigite, $Ca_7Mg(SiO_4)_4$; hatrurite, $Ca_3[O|SiO_4]$; rosenhahnite, $HCa_3[Si_3O_9(OH)]$; dellaite, $Ca_6Si_3O_{11}(OH)_2$; afwillite, $Ca_3[HSiO_4]_2.2H_2O$; xonotlite, $Ca_6Si_6O_{17}(OH)_2$; jaffeite, $Ca_6[(OH)_6|Si_2O_7]$; suolunite, $Ca_2[H_2Si_2O_7].H_2O$; killalaite, $Ca_3[Si_2O_7].O.5H_2O$; okenite, $CaSi_2O_5.2H_2O$; riversideite, $Ca_5Si_6O_{16}(OH)_2.2H_2O$; trabzonite, $Ca_4Si_3O_{18}.2H_2O$; gyrolite, $Ca_4(Si_6O_{15})(OH)_2.3H_2O$; foshallasite, $Ca_3[Si_2O_7].3H_2O$; tobermorite, $Ca_5Si_6(O,OH)_{18}.5H_2O$; clinotobermorite, $Ca_5[Si_3O_8(OH)_2]2.4H_2O—Ca_5[Si_6O_{17}].5H_2O$; nekoite, $Ca_3Si_6O_{12}(OH)_6.5H_2O$; plombièrite, $Ca_5Si_6O_{16}(OH)_2.7H_2O$; jennite, $Ca_9H_2Si_6O_{18}(OH)_8.6H_2O$; sillimanite $[Al_2SiO_5]$; tremolite $[Ca_2Mg_5Si_8O_{22}(OH)_2]$ and the like, and mixtures thereof.

Wollastonite is a preferred source of reinforcing particles. In addition to the benefits discussed above, wollastonite exhibits low moisture and oil absorption, low volatile content, and/or high brightness or whiteness—each of which may be desirable in certain embodiments. In some embodiments, the wollastonite may contain small amounts of iron, magnesium, and manganese that may substitute for calcium.

In a presently preferred embodiment, the wollastonite reinforcing particles are acicular. Examples of suitable commercially available acicular wollastonite reinforcing particles include the FILLEX line of products (e.g., the FILLEX 1AE1, 7AE1,6-AF3, and 2AH3 products) commercially available from H. Osthoff-Petrasch GmbH & Co. of KG, Germany, and the A-60 product commercially available from Wolkem (India), NYCO Minerals Inc. (USA) and R.T. Vanderbilt Co. Inc. (USA).

Reinforcing particles of the present invention may be surface treated or modified. Such surface modification may result in one of the following benefits: improved aesthetics (e.g., appearance, resolution, etc.), improved fabrication, improved dimensional stability, enhanced surface characteristics (e.g., improved water repellency or hydrophobicity), improved wet-out between resin and filler components, controlled rheological properties (e.g., higher loading with elimination or reduction in viscosity increases), improved filler dispersion (e.g., elimination or reduction in occurrence of filler agglomerates), and combinations thereof. Silane-surface treatment is an example of a preferred surface treatment.

The reinforcing particles of the present invention preferably have a bulk density of at least about 0.3 grams per cubic centimeter ("g/cc"), more preferably at least about 0.5 g/cc, and even more preferably at least about 0.7 g/cc. In preferred embodiments, the reinforcing particles preferably have a bulk density of less than about 5 g/cc, more preferably less than about 4 g/cc, and even more preferably less than about 2 g/cc.

As discussed above, powder compositions of the present invention preferably include one or more laser-sinterable polyester polymer powders. When suitably processed in a LS machine, the laser-sinterable polymer powders are preferably capable of forming an LS article having a polymeric matrix.

Current commercially available LS machines are typically capable of sintering materials having a melting temperature ("$T_m$") of about 220° C. or less. To be useful in processes utilizing such machines, powder compositions of the present invention preferably include at least one laser-sinterable polymer powder having a "medium-high" melting temperature. Suitable semi-crystalline or crystalline polyester polymers for use in the present invention generally will have a melting temperature of less than about 220° C., more preferably less than about 210° C., even more preferably less than about 190° C., and even more preferably less than about 175° C. Powder compositions of the present invention preferably do not melt at a temperature less than or equal to a maximum temperature at which LS articles formed therefrom are desired to perform. In preferred embodiments, the one or more laser-sinterable polymer powders preferably have a melting temperature of greater than about 120° C., more preferably greater than about 130° C., and in certain preferred embodiments greater than about 150° C.

Suitable semi-crystalline or crystalline polyester polymers may exhibit any suitable percent crystallinity. In preferred embodiments, the powder composition of the invention includes at least one semi-crystalline or crystalline polyester polymer having a percent crystallinity (on a volume basis) of at least 5%, more preferably at least 10%, and even more preferably at least 20%. By way of example, the percent crystallinity for a given polyester polymer may be assessed via differential scanning calorimetry (DSC) testing using the following equation:

Percent crystallinity (%)=[$A/B$]×100, where "A" is the heat of fusion of the given polyester polymer (i.e., the total area "under" the melting portion of the DSC curve) in Joules per gram (J/g) and "B" is the heat of fusion in J/g for the 100% crystalline state of the polymer. The DSC methodology described herein (e.g., sample size, scan rate, etc.) may be used for the DSC analysis. For many polymers, a theoretical B value may be available in the scientific literature and such value may be used. If such a B value is not available in the literature, then a B value of 145 J/g may be used as an approximation, which is the heat of fusion for 100% crystalline polybutylene terephthalate (PBT) as reported in: Cheng, Stephen, Pan, Robert; and Wunderlich, Bernard; "Thermal analysis of poly(butylene terephthalate) for heat capacity, rigid-amorphous content, and transition behavior," *Macromolecular Chemistry and Physics*, Volume 189, Issue 10 (1988): 2219-2512.

Suitable polyester polymers for use in the present invention generally will have a glass transition temperature ("$T_g$") of less than about 80° C. more preferably less than about 60° C., and even more preferably less than about 40° C. Suitable polyester polymers for use in the present invention generally will have a glass transition temperature of more than about −30° C., more preferably more than about 0° C. and even more preferably more than about 10° C.

Suitable semi-crystalline or crystalline polyester polymers for use in the present invention generally will have a recrystalization temperature ("$T_c$") of less than about 150° C., more preferably less than about 120° C., and even more preferably less titan about 100° C. In preferred embodiments, the temperature difference between the $T_m$ and $T_c$ is greater than 25° C. even more preferably greater than 50° C., and optimally greater than 75° C.

The above $T_m$, $T_g$, $T_c$ values may be determined, for example, using DSC at a constant scanning rate such as 10° C. per minute (starting, e.g., at 80° C. for $T_m$ and $T_g$ measurement and ending at 250° C., and the reverse for $T_c$ measurement), with each of the $T_m$, $T_g$, and $T_c$ values corresponding to the respective "peak" value. By way of example, the aforementioned DSC data may be generated using a model 822e DSC instrument from Mettler Toledo using samples weighing approximately 10 milligrams sealed in aluminum sample pans.

The polyester polymers included in powder compositions of the inventions may include backbones of any suitable structural configuration. The backbone can have different structural configurations depending on a variety of factors such as the materials used to form the backbone, cost, and the desired end use for the polymer. Polyester polymers of the invention may include one or more segments or linkages other than polyester segments or linkages, preferably so long as the presence of such segments and/or linkages does not render the material unsuitable for use in producing three-dimensional sintered articles such as, for example, LS articles. For example, the backbones of the one or more polyester polymers may optionally include one or more linkages such as, for example, amide, carbonate ester, ether, imide, imine, urea, or a combination thereof. Similarly, the backbones may optionally include one or more oligomer or polymer segments selected from, for example, acrylic, polyamide, poly(carbonate ester), epoxy, polyether, polyimide, polyimine, polyurea, copolymer segments thereof, or a combination thereof.

Typically, however, at least 50 wt-% of the one or more polyesters will comprise polyester units. In some embodiments, substantially all (e.g., >80 wt-%, >90 wt-%, >95 wt-%, etc.), or all, of the one or more polyesters comprises polyester units. The aforementioned polyester unit wt-%'s correspond to the total weight of poly-acid monomers (typically diacids) and polyol monomers (typically diols) used to form ester linkages relative to the total weight of reactants used to form the polyester. Thus, for example, if an oligomer having one or more ester groups is incorporated into the polyester resin, the wt-% of polyester units is calculated using the total weight of the poly-acid and polyol monomers used to form the one or more ester linkages of the oligomer (as opposed to the weight of the oligomer). Anhydrides and/or esters of poly-acid monomers, which react with polyol to form ester groups, are considered as poly-acid monomers for purposes of the aforementioned wt-% polyester units.

Powder compositions of the present invention may include any suitable amount of the one or more laser-sinterable polymer powders. Preferably, the powder composition includes at least about 20 wt-%, more preferably at least about 50 wt-%, and even more preferably at least about 60 wt-% of laser-sinterable polymer powder, based on the total weight of the powder composition. In preferred embodiments, the powder composition includes less than about 97 wt-%, more preferably less than about 85 wt-%, and even more preferably less than about 80 wt-% of laser-sinterable polymer powder, based on the total weight of the powder composition.

In preferred embodiments, the powder composition of the present invention includes one or more sinterable polyester powder, more preferably one or more laser-sinterable polyester powders. Samples of suitable polyester resins may include aliphatic and aromatic polyester resins. Aromatic polyester resins are presently preferred.

Aromatic polyester resins having any suitable number of aromatic groups may be used. The polyester resin preferably includes at least, about 5 wt-%, more preferably at least about 20 wt-%, even more preferably at least about 40 wt-%, and even more preferably at least about 65 wt-% of aromatic groups. In some embodiments, the aromatic polyester resins may include up to 75 wt-% or more of aromatic groups. The aforementioned wt-%'s correspond to the total weight of aromatic monomers used to from the polyester resin relative to the total weight of the reactants used to from the polyester resin. Thus, for example, if an oligomer having an aromatic group is incorporated into the polyester resin, the wt-% of the aromatic group in the polymer is calculated using the weight of the aromatic monomer used to form the oligomer (as opposed to the weight of the oligomer). Suitable aromatic monomers include, for example, acid-, ester-, or anhydride-functional aromatic monomers (e.g., aromatic monoacids and/or polyacids, more preferably aromatic polyacids); hydroxyl-functional aromatic monomers (e.g., aromatic mono- and/or poly-functional monomers); or aromatic monomers having one or more (typically at least two) reactive groups capable of participating in a condensation reaction with a complimentary reactive group (more preferably, a hydroxyl, carboxylic acid, ester, or anhydride groups) to form a covalent linkage. Examples of presently preferred aromatic monomers include terephthalic acid, isophthalic acid, dimethyl terephthalate, dimethyl isophthalate or a combination thereof.

Preferably, the polyester resin (or blend of resins) comprises a majority of semi-crystalline or crystalline polyesters or polyester segments. A minority of amorphous polyester (or amorphous segments) may be used, for example, to moderate the rate of re-crystallization of the material. In preferred embodiments, the material has between 0 and 49.9 wt-%. based on the weight of the polyester resins, of an amorphous polyester, and 50.1 to 100 wt-% semi-crystalline or crystalline polyester. In more preferred embodiments, the material has between 0 and 30 wt-%, based on the weight of the polyester resins, of an amorphous polyester, and 70 to 100 wt-% semi-crystalline or crystalline polyester. In most preferred embodiments, the material has between 10 and 25 wt-%, based on the weight of the polyester resins, of an amorphous polyester, and 75 to 90 wt-% semi-crystalline or crystalline polyester.

Classis amorphous polyester polymers do not, for example, exhibit any discernible melting point (e.g., do not exhibit a DSC melting peak) nor include any crystalline regions. Thus, such classic amorphous polyester polymers would be expected to exhibit a percent crystallinity of 0%. Accordingly, powder blends of the invention may include one or more amorphous polyester polymers having a % crystallinity of 0% or substantially 0%. If desired, however, powder blends of the invention may include one or more "amorphous" polyester polymers having a % crystallinity other than 0 (e.g., less than 5%, less than 2%, less than 1%, less than 0.5%, less than 0.1%, etc.)

Suitable polyesters include polyesters formed from one or more suitable polycarboxylic acid components (e.g., dicarboxylic acid components) and one or more suitable polyol components (e.g., diol components).

Suitable dicarboxylic acid components include, for example, aromatic dicarboxylic acids such as terephthalic acid, isophthalic acid, phthalic acid and naphthalenedicarboxylic acid; and aliphatic dicarboxylic acids such as adipic acid, cyclohexane dicarboxylic acid, sebacic acid and azelaic acid. Examples of other suitable polycarboxylic acids include benzene-pentacarboxylic acid; mellitic acid; 1,3,5,7 napthaline-tetracarboxylic acid; 2,4,6 pyridine-tricarboxylic acid; pyromellitic acid; trimellitic acid; trimesic acid; 3,5, 3',5'-biphenyltetracarboxylic acid; 3,5,3',5'-bipyridyltetracarboxylic acid; 3,5,3',5'-benzophenonetetracarboxylic acid; 1,3,6,8-acridinetetracarboxylic acid; 1,2,4,5-benzenetetracarboxylic acid. Anhydrides or esters of the aforementioned acids, and mixtures of such acids, anhydrides or esters may also be used.

Suitable diol components include, for example, polymethylene glycols represented by the formula HO—$(CH_2)_n$—OH (where n is about 2 to 10) such as ethylene glycol, propylene glycol, butanediol, hexanediol and decamethylene glycol; branched glycols represented by the formula HO—$CH_2$—$C(R_2)$—$CH_2$—OH (where R is an alkyl group having 1 to 4 carbon atoms) such as neopentyl glycol; diethylene glycol and triethylene glycol, and diols having a cyclohexane ring such as cyclohexane dimethanol (CHDM). 2-methyl-1,3 propane diol may also be used. Glycerol, trimethylol propane, and other suitable polyols may also be used.

In some embodiments, one or more of the polyester resins is an aromatic semi-crystalline or crystalline polyester derived from reactants including (i) one or more of terephthalic acid or isophthalic acid; (ii) one or more of 1,4-butandiol, ethylene glycol, adipic acid, or 1,3 propane diol; (iii) one or more of sebacic acid, orthophthalic acid, diethylene glycol, neopentyl glycol, 1,6 hexanediol, cyclohexane dimethanol, or 1,2 propanediol; or (iv) any combination of (i) and (ii); (i) and (iii); (ii) and (iii); or (i), (ii) and (iii).

Suitable exemplary crystalline and semi-crystalline polymers include PET, PET/I (molar ratio of ethylene terephthalate/ethylene isophthalate is preferably at least about 65/35), polyethylene-2,6-naphthalate, and poly-1,4-cyclohexylenedimethylene terephthalate.

An example of a particularly suitable semi-crystalline polymer is a polyester resin derived from (i) acid monomers including terephthalic acid (approximately two-thirds by weight of the total acid monomers), isophthalic acid (approximately one-third by weight of the total acid monomers) and (ii) diols primarily, or exclusively, comprising 1,4 butanediol. In one embodiment, the aforementioned polyester is derived from acid monomers further including adipic acid in an amount of, for example, less than about 5 wt-% of the total acid monomers, with the weight percents of terephthalic acid and isophthalic acid adjusted accordingly. In another embodiment, 1,3 propane diol is used either instead of 1,4 butanediol or as a replacement for at least a portion of the 1,4 butanediol.

Preferred polyesters have an intrinsic viscosity of at least about 0.3, more preferably at least 0.5, and most preferably at least 0.6. Preferred polyesters have an intrinsic viscosity of less than about 1.2, more preferably less than 0.9, and most preferably less than 0.8.

Preferred polyesters have a weight average molecular weight of at least about 10,000, more preferably at least 20,000, and most preferably at least 25,000. Preferred polyesters have a weight average molecular weight of less than about 80,000, more preferably less than 50,000, and most preferably less than 45,000. The weight average may be higher than 80,000, but it is expected that such polymers will perhaps have difficulty flowing adequately, and the process will have to be slower. Also, the weight average may be lower than 10,000, but it is expected that such polymers will have lower than optimal strength.

Preferred polyesters, when sintered into parts (e.g., ISO 3167 Type 1A specimens), have a elastic modulus (or tension modulus) of at least 100 Mpa, more preferably at least 400 MPa, and most preferably at least 800 MPa. In some embodiments, the elastic modulus of such sintered polyester parts may be less than 3,000 MPa or less than 2,000 MPa. Preferred powder compositions, when sintered into parts (e.g., ISO 3167 Type 1A specimens), have an elastic modulus of at least 200 Mpa, more preferably at least 500 MPa, and most preferably at least 1,000 MPa. In some embodiments, the elastic modulus of such sintered powder compositions may be less than 5,000 MPs or less than 3,000 MPa. In some embodiments, the powder compositions, when sintered into parts (e.g., ISO 3167 Type 1A specimens), have a "high" elastic modulus of at least 800 Mpa. A suitable methodology for determining the elastic modulus of sintered parts is provided in the Test Methods section. Suitable parameters (e.g., layer thickness, LS machine parameters, etc.) for producing sintered test parts such as, e.g., ISO 3167 Type 1A specimens, are provided in the Test Methods and Examples sections.

Examples of other suitable laser-sinterable polymers which may be used in combination with the polyester polymers (e.g., as a blend) may include powders suitably formed from polyamides, polyolefins (e.g., polyethylene and polypropylene), polyetherketones, polyurethanes, PVOH, polyethers, polyvinyl acetates, polymethacrylates, phenolics, ionomers, polyacetals, acrylonitrile-butadiene-styrene copolymers, polyimides, polycarbonates, and copolymers and mixtures thereof. Thermosetting and/or radiation-curable resins may also be included in powder compositions of the present invention. Thermo- or radiation-curable resins typically provide an inflexible article in an LS process. Examples of suitable thermo- or radiation-curable resins may include epoxies, acrylates, vinyl ethers, unsaturated polyesters, bismaleimides, and copolymers and mixtures thereof. In some embodiments, thermoplastic resins, thermosetting resins, radiation-curable resins, or a mixture of such resins may be included in powder components of powder compositions of the present invention.

The polymer particles making up the laser-sinterable polymer powder preferably exhibit a maximum dimension of at least about 10 microns, more preferably at least about 20 microns, and even more preferably at least about 40 microns. In preferred embodiments, the laser-sinterable polymer particles preferably exhibit a maximum dimension of less than about 200 microns, more preferably less than about 150 microns, and even more preferably less than about 80 microns. In some embodiments, the reinforcing particles and laser-sinterable polymer powder are selected so that the maximum dimension of the reinforcing particles is approximately equivalent to or smaller than the maximum dimension of the polymer particles of the laser-sinterable polymer powder.

The laser-sinterable polymer powder preferably has a bulk density of at least about 0.3 g/cc, more preferably at least about 0.35 g/cc, and even more preferably at least about 0.4 g/cc. In preferred embodiments, the laser-sinterable polymer powder preferably has a bulk density of less than about 3 g/cc, more preferably less than about 2 g/cc, and even more preferably less than about 1 g/cc.

Powder compositions of the present, invention may also contain one or more other optional ingredients. Preferably, the optional ingredients do not adversely affect the powder compositions or articles formed therefrom. Such optional ingredients may be included, for example, to enhance aesthetics; to facilitate manufacturing, processing, and/or handling of powder compositions or articles formed therefrom; and/or to further improve a particular property of powder compositions or articles formed therefrom. Each optional ingredient is preferably included in a sufficient amount to serve its intended purpose, but not in such an amount to adversely affect a powder composition or an article resulting therefrom. Certain of these optional ingredients are preferably particulate materials and may include organic and/or inorganic materials or materials that may be co-compounded with the polymer. Optional ingredients preferably have a particle size in the range of the particle sizes of the polymer powder and/or the reinforcing particles. Each optional ingredient is preferably milled, if necessary, to the desired median particle size and particle size distribution.

Each individual optional ingredient, if present at all, typically is present in the powder composition in an amount of about 0.1 wt-% to about 50 wt-%. The total amount of optional ingredients in the powder composition preferably ranges from about 0 wt-% up to about 50 wt-%. It is not necessary for an optional ingredient to melt dining a LS process. Preferably each optional ingredient is suitably compatible with the one or more powder polymers and/or the reinforcing particles to provide a strong and durable article.

In some embodiments, the powder composition of the present invention contains an optional flow agent. The flow agent preferably is present in an amount sufficient to allow the powder composition to flow and level on the build surface of a LS machine. When present, the powder composition preferably contains about 0.01 wt-% to about 5 wt-%, more preferably about 0.05 wt-% to about 2 wt-%, and even more preferably about 0.1 wt-% to about 1 wt-% of flow agent, based on the total weight of the powder composition. The optional flow agent is preferably a particulate inorganic material having a maximum dimension of less than about 10 microns. Examples of suitable flow agents include hydrated silica, amorphous alumina, glassy silica, glassy phosphate, glassy borate, glassy oxide, titania, talc, mica, a fumed silica, kaolin, attapulgite, calcium silicate, alumina, magnesium silicate, and mixtures thereof. Fumed silica is a preferred flow agent.

In some embodiments, the powder composition of the present invention may include metal (or surface-treated metal) fillers such as, for example, aluminum powder, copper powder, tin powder, bronze powder, and mixtures thereof.

Additional optional ingredients include, for example, toners, extenders, fillers, colorants (e.g., pigments and dyes), lubricants, anticorrosion agents, thixotropic agents, dispersing agents, antioxidants, adhesion promoters, light stabilizers, organic solvents, surfactants, flame retardants, and mixtures thereof.

Preferably, each ingredient of the powder composition of the present invention is suitably dry (e.g., contains a minimal amount of moisture—preferably 2 wt-% or less). All composition ingredients may be milled, ground, or otherwise processed, if necessary, to provide a desired particle size or range of particle sizes.

Powder compositions of the present invention may be formed using any suitable technique. The ingredients may be blended together all at once or in any order. Preferably, the ingredients are blended until a uniform powder composition has been formed. The ingredients may be blended using mechanical mixing, pneumatic mixing (e.g., by blowing air into silos that contain the various components), or any other suitable mixing technique. After blending, the resulting powder composition may be sieved to provide a powder having a desired particle size and particle size distribution.

In some embodiments, the reinforcing particles (or other optional ingredients) may be melt blended with polymer pellets or polymer powders and then palletized into small pellets containing the reinforcing particles embedded within. The pellets may then be processed using any suitable techniques (e.g., cryogenic milling) to form a suitable powder composition.

LS Articles of the present invention may be produced from the powder compositions using any suitable LS processes. LS articles of the present invention preferably include a plurality of overlying and adherent sintered layers that include a polymeric matrix which, in some embodiments, have reinforcement particles dispersed throughout the polymeric matrix.

The sintered layers of LS articles of the present invention may be of any thickness suitable for LS processing. The plurality of sintered layers are each, on average, preferably at least about 50 microns thick, more preferably at least about 80 microns thick, and even more preferably at least about 100 microns thick. In a preferred embodiment, the plurality of sintered layers are each, on average, preferably less than about 200 microns thick, more preferably less than about 150 microns thick, and even more preferably less than about 120 microns thick. Three-dimensional articles produced from powder compositions of the invention using a layer-by-layer sintering other than laser sintering may have layer thicknesses that are the same or different from those described above.

Accordingly, it is contemplated that the powder composition of the invention may be used in sintering processes other than LS. For example, sintering of the powder composition may be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation may be used, including, for example, infrared radiation sources, microwave generators, lasers, radiative heaters, lamps, or a combination thereof.

In some embodiments, selective mask sintering ("SMS") techniques may be used to produce three-dimensional articles of the invention. For further discussion of SMS processes, see for example U.S. Pat. No. 6,531,086 which describes an SMS machine in which a shielding mask is used to selectively block infrared radiation, resulting in the selective irradiation of a portion of a powder layer. If using an SMS process to produce articles from powder compositions of the invention, it may be desirable to include one or more materials in the powder composition that enhance the infrared absorption properties of the powder composition. For example, the powder composition may include one or more heat absorbers and/or dark-colored materials (e.g., carbon black, carbon nanotubes, or carbon fibers).

The powder composition of the invention may also be useful in printing processes to form three-dimensional articles. For further discussion of such techniques, see for example U.S. Pat. No. 7,261,542.

Figure 3A:
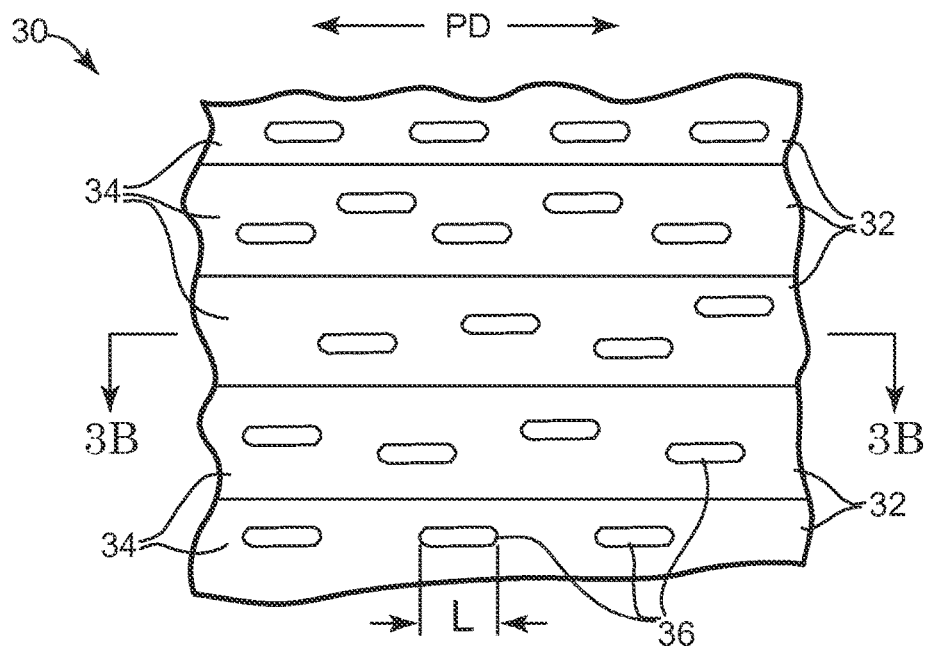
FIG. 3A is a schematic cross-sectional view of a portion of a LS article containing reinforcing particles.
Figure 3B:
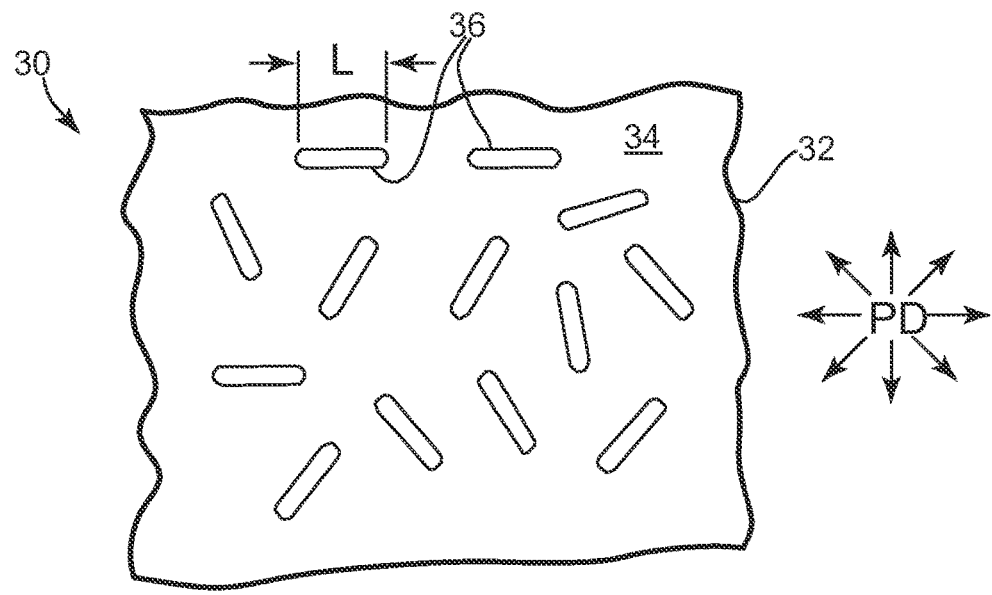
FIG. 3B is a schematic cross-sectional view of the LS article portion of FIG. 3A. as taken along line 3B-3B of FIG 3A.

FIGS. 3A and 3B illustrate a representative sample of one embodiment of LS article 30, with FIG. 3A showing a schematic side cross-sectional view of LS article 30 and FIG. 3B showing a schematic top cross-sectional view of LS article 30 as taken along line 3B-3B of FIG. 3A. FIGS. 3A and 3B are not drawn to scale. LS article 30 preferably includes a plurality of adherent sintered layers 32 that include polymer matrix 34 and optional reinforcing particles 36 dispersed throughout matrix 34.

Certain embodiments of the powder composition of the present invention (e.g., those including a suitable amount of mineral reinforcing particles) may be formed into molds, via a suitable LS process, that are capable of molding molten materials (e.g., plastics and rubbers) into molded products. In a preferred embodiment, the powder composition is configured so that a mold formed therefrom is capable of suitably molding a molten material having a temperature of greater than 130° C., more preferably greater than about 140° C., and even more preferably greater than about 150° C. into a molded product.

Some non-limiting embodiments of the invention are provided below to further exemplify the invention.

Embodiment A. A powder composition that includes at least one semi-crystalline or crystalline aromatic sinterable (more preferably laser-sinterable) polyester polymers having a melting temperature between 120 and 220° C.

Embodiment B. A powder composition that includes at least one semi-crystalline or crystalline sinterable (more preferably laser-sinterable) polyester polymers having a melting temperature between 150 and 220° C.

Embodiment C. A powder composition that includes a blend of two or more sinterable (more preferably laser-sinterable) polyester polymers, wherein (i) at least one of the polyester polymers is semi-crystalline or crystalline and (ii) at least one of the polyester polymers is amorphous.

Embodiment D. A powder composition that includes at least one semi-crystalline or crystalline sinterable (more preferably laser-sinterable) polyester polymers having a melting temperature between 120 and 220° C. and a recrystallization temperature of less than 150° C. and wherein the temperature difference between the $T_m$ and $T_c$ is greater than 25° C., preferably greater than 50° C., and even more preferably greater than 75° C.

Embodiment E. A powder composition of Embodiments A, C, or D, wherein the at least one semi-crystalline or crystalline sinterable polyester polymers has a melting temperature from greater than 150° C. to 220° C.

Embodiment F. A powder composition of Embodiments A, C, or D, wherein the at least one semi-crystalline or crystalline sinterable polyester polymers has a melting temperature between 130° C. and 190° C.

Embodiment G. A powder composition of any of Embodiments A-F. wherein the at least one semi-crystalline or crystalline sinterable polyester polymers has a glass transition temperature between −30 and 80° C.

Embodiment H. A powder composition of any of Embodiments A-F, wherein the at least one semi-crystalline or crystalline sinterable polyester polymers has a melting temperature from greater than 150 to 190° C and a glass transition temperature between −30 and 80° C.

Embodiment I. A powder composition of any of Embodiments A-C or E-H, wherein the at least one semi-crystalline or crystalline sinterable polyester polymers has a recrystallization temperature of less than 150° C. and wherein the temperature difference between the $T_m$ and $T_c$ is greater than 25° C.

Embodiment J. A powder composition of any of Embodiments A-I, wherein the at least one semi-crystalline or crystalline sinterable polyester polymer includes aromatic groups that constitute at least 10 wt-% of the semi-crystalline or crystalline laser-sinterable polyester polymer, based on the total weight of aromatic monomers used to form the one or more semi-crystalline or crystalline laser-sinterable polyester polymers Embodiment K. A powder composition of any of Embodiments A-J, wherein the at least one semi-crystalline or crystalline sinterable polyester polymers includes aromatic groups derived from one or more of terephthalic acid, isophthalic acid, dimethyl terephthalate, or dimethyl isophthalate.

Embodiment L. A powder composition of any of Embodiments A-K, wherein the at least one semi-crystalline or crystalline sinterable polyester polymers includes units derived from one or more of 1,4-butandiol, ethylene glycol or adipic acid.

Embodiment M. A powder composition of any of Embodiments A-L, wherein the at least one semi-crystalline or crystalline sinterable polyester polymers has a weight average molecular weight of between 10,000 and 80,000.

Embodiment N. A powder composition of any of Embodiments A-M, wherein the powder composition comprises between 50 to 100 weight percent semi-crystalline or crystalline polyester, based on the weight of polymeric materials in the powder.

Embodiment O. A powder composition of any of Embodiments A, B, and D-N, wherein the powder composition further comprises at least one amorphous polyester polymer.

Embodiment P. A powder composition of any of Embodiments A-O, wherein the powder composition comprises at least 5, at least 10, or at least 15 wt-% of one or more amorphous polyester polymers, based on the weight of polymeric materials in the powder.

Embodiment Q. A powder composition of any of Embodiments A-P, wherein the at least one semi-crystalline or crystalline sinterable polyester polymers has an elastic modulus, when formed into laser sintered parts, of between 400 and 3,000 MPa or between 500 and 2,000 MPa.

Embodiment R. A powder composition of any of Embodiments A-Q, wherein the powder composition further includes at least 5 weight percent reinforcing particles, based on the total weight of the powder composition.

Embodiment S. A powder composition of any of Embodiments A-R, wherein the powder composition includes at least about 3 weight percent of reinforcing particles having an aspect ratio of at least about 5:1, at least about 10:1, or at least about 20:1 and a maximum dimension of less than about 300 microns, based on the total weight of the powder composition.

Embodiment T. A powder composition of Embodiment R or S, wherein at least a portion of the reinforcing particles are mineral particles that comprise at least about 1 wt-% of the powder composition, based on the total weight of the powder composition.

Embodiment U. A powder composition of Embodiment T, wherein the mineral particles comprise wollastonite.

Embodiment V. A powder composition of any of Embodiments A-T, wherein the at least one semi-crystalline or crystalline sinterable polyester polymers includes one or more aromatic groups.

Embodiment W. A powder composition of any of Embodiments A-V, wherein the at least one semi-crystalline or crystalline sinterable polyester polymers exhibits a percent crystallinity of at least 5%, more preferably at least 10%. and even more preferably at least 20%.

Embodiment X. A three-dimensional article prepared by sintering (e.g., in a layer-by-layer process) the powder composition of any of Embodiments A-W.

Embodiment Y. A three-dimensional article prepared by selectively laser sintering (e.g., in a layer-by-layer process) the powder composition of any of Embodiment A-W to form a three-dimensional article.

Embodiment Z. A method comprising:
providing a layer of a powder composition of any of Embodiments A-W;
selectively sintering at least a portion of the powder layer; and
forming a three-dimensional article by applying one or more additional layers to a preceding layer.

TEST METHODS

Unless indicated otherwise, the following test methods were utilized in the Examples that follow. The elongation at break, tensile strength at break, and tension modulus testing was performed using International Standard Organization (ISO) 3167 Type 1A 150 mm long multipurpose dog-bone test specimens having a center section that was 80 mm long by 4 mm thick by 10 mm wide and having sintered layers oriented in a flatwise planar direction relative to the flatwise face of the test specimens (i.e., in a direction similar to that of LS test specimens for HDT testing).

A. Heat Deflection Temperature

HDT testing was performed using Method A of ISO 75-2:2004 to assess the mechanical properties of LS articles at elevated temperatures. In accordance with method A of ISO 75-2:2004, 1.8 megapascals ("MPa") were applied to 80×10×4 millimeters (mm) (length×width×thickness) LS test specimens in tire flatwise position.

B. Flotation at Break

Elongation at break testing was performed according to ISO 527. LS test specimens formed from powder compositions of the present invention preferably exhibit an elongation at break of at least about 3%, more preferably at least about 5%, and even more preferably at least about 10%.

C. Tensile Strength at Break

Tensile strength at break testing w as performed according to ISO 527. LS test specimens formed from powder compositions of the present invention preferably exhibit a tensile strength at break of at least about 30 MPa, more preferably at least about 40 MPa, and even more preferably at least about 50 MPa.

D. Tension Modulus

Tension modulus testing was performed according to ISO 527.

EXAMPLES

The present invention is illustrated by the following examples. It is to be understood that the particular examples, materials, amounts, and procedures ate to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich. St. Louis, Mo.

| ABBREVIATIONS, DESCRIPTIONS, AND SOURCES OF MATERIALS | |
|---|---|
| AEROSIL R972 | Surface-treated amorphous silica from Evonik Industries AG of Frankfurt, Germany. |
| ALUMET H30 | Substantially spherical aluminum powder from Valimet of Stockton, CA. |
| FILLEX2 AH3 | Silane-surface-treated wollastonite from MIAL - Feldmeilen of Switzerland, which according to product literature has an aspect ratio from about 15:1 to 20:1. |
| Blanc Fixe | Barium sulphate from Sachtleben |
| ASP 400 | Aluminum silicate from Aspanger |
| Perenol F 30 P | Flow additive from Cognis |
| ULTRADUR B2550 | Polybutylene terephthalate (PBT) from BASF. |

Examples 1-9

Preparation of Polymer Powders

For each of the powder compositions of Examples 1-9, the materials listed in Table 1 were added in the indicated amounts to the mixing vessel of a Mixaco Mischer CM 150 mixer, by dry blending at 100 revolutions-per-minute ("rpm") in three 45-second-long mixing steps to form homogenous powder blends. Compositions whose ingredients were not all in powder form were melt blended using an extruder from O.C.M. SRL, cryogenically milled into powder, and subsequently dry blended with the remaining powder ingredients. In Examples 1, 3, 4, and 6-9, the ingredients indicated in Table 1 were melt blended together, with the exception of the AEROSIL RV972, FILLEX 2AH3, and ALUMET H30 materials, which were available in powder form.

To assess the suitability of the powders for producing LS articles, each of the respective powders of Examples 1-7 and 10 were applied to a build surface of a VANGUARD HS LS system (from 3D Systems of Rock Hill, S.C.) and used to construct LS articles. The LS articles were produced using layer thicknesses of between about 0.1 and 0.15 mm, a laser power setting of between about 20 and 50 Watts, and a laser scan spacing of between about 0.15 mm and 0.40 mm. The resulting LS articles exhibited good coloration and resolution and did not exhibit any noticeable curl, thereby indicating that the powders of Examples 1-7 were suitable for use in forming LS articles.

To assess the properties of LS articles of the present invention, test specimens were produced from the powders of each of Example 1-7 using the VANGUARD HS LS system. The test specimens of Examples 1-7 exhibited suitable mechanical properties. In general, the filled test specimens exhibited an HDT that was markedly higher than that of the unfilled specimens. It is believed dial Examples 8 and 9 will similarly perform in an acceptable manner. Attempts to produce suitable tests specimens from the Example 10 powder were unsuccessful due to curling problems associated with layers sintered from the powder.

DSC testing was performed on the specimens and the materials of Examples 1-7 and were found to have $T_m$, $T_c$ and $T_g$ as follows (all in ° C.):

TABLE 2

| Example | Tm | Tc | Tg |
|---|---|---|---|
| 1 | 148 | 94 | ~37 est.* |
| 2 | 147 | — | ~37 est.* |
| 3 | 147 | — | 35 |
| 4 | 149 | 92 | 37 |
| 5 | 145 | — | 34 |
| 6 | 146 | 92 | ~37 est.* |
| 7 | 147 | 102 | 37 |
| 10 | 225 | 194 | — |

*Not measured, but estimated based on polymers used.

TABLE 1

| | Example | | | | | | | | | |
|---|---|---|---|---|---|---|---|---|---|---|
| Material* | 1 | 2 | 3 | 4 | 5 | 6 | 7 | 8 | 9 | 10 |
| Semi-crystalline polyester[1] | 57.45 | 84.75 | 69.75 | 54.50 | 99.75 | 68.25 | 82.00 | 66.00 | 50.00 | |
| Amorphous polyester[2] | 12.65 | | 15.00 | 12.05 | | 16.00 | 17.75 | 33.75 | 49.75 | |
| ULTRADUR B2550[3] | | | | | | | | | | 99.8 |
| Blanc Fixe | 6.75 | | | 6.40 | | 8.00 | | | | |
| ASP 400 | 6.75 | | | 6.40 | | 8.00 | | | | |
| Perenol F 30 P | 0.45 | | | 0.40 | | 0.50 | | | | |
| AEROSIL R972 | 0.25 | 0.25 | 0.25 | 0.25 | 0.25 | 0.25 | 0.25 | 0.25 | 0.25 | 0.2 |
| FILLEX 2AH3 | 15.70 | 15.00 | 15.00 | | | | | | | |
| ALUMET H30 | | | | 20.00 | | | | | | |

[1]Semi-crystalline aromatic polyester having a number average molecular weight of approximately 11,000. The polyester sample is derived from acid monomers including a majority by weight of terephthalic acid and a minority by weight of isophthalic acid and diols comprising a majority by weight of 1,4 butanediol and a minority by weight of 1,3 propanediol. The polyester sample was determined to have a heat of fusion (via DSC) of 23 J/g, which corresponds to about 16% crystallinity when using the heat of fusion for 100% crystalline PBT (i.e., 145 J/g).
[2]Amorphous aromatic polyester that is a copolymer of terephthalic acid, isophthalic acid, and ethyleneglycol and has an estimated number average molecular weight of approximately 20,000 to 25,000 and a percent crystallinity believed to be substantially less than 5% (e.g., 0 or less than 1%).
[3]The ULTRADUR B2550 product has a measured heat of fusion (via DSC) of 28 J/g, which corresponds to 19% crystallinity when using the heat of fusion for 100% crystalline PBT (i.e., 145 J/g).
*Materials listed in parts by weight.

The $T_m$ and $T_g$ values reported in Table 2 correspond to "peak" values that were measured by DSC testing using a model 822e DSC apparatus from Mettler Toledo instrument. Samples weighing approximately 7-15 mg were sealed in an aluminum sample pan (the reference pan was empty) and a scan rate of 10° C. per minute was used starting at a temperature of 80° C. and ending at 210° C. The Tc values reported in Table 2 are "peak"values that were measured by DSC testing using a scan rate of 10° C. per minute starting at a temperature of 210° C. and ending at 80° C.

Melt flow and bulk density were measured for Examples 1-7 and are reported as follows:

TABLE 3

| Example | Melt Flow Index* (g/10 min) | Bulk density (g/ml) |
| --- | --- | --- |
| 1 | 26 | 0.68 |
| 2 | 61 | 0.62 |
| 3 | 36 | 0.61 |
| 4 | 27 | 0.72 |
| 5 | 95 | 0.60 |
| 6 | 36 | 0.68 |
| 7 | 67 | 0.60 |

*Measured using DIN ISO 1133 (5 kg/190° C./240 second pre-heating).

The powders of Examples 1-7 were laser sintered into test articles (i.e., ISO 3167 Type 1A multipurpose dog-bone test specimens) to assess the mechanical properties of articles formed from the respective materials. The machine parameters of the VANGUARD HS LS system were optimized within the ranges previously described for each of the Example powders. Mechanical properties were measured for the test articles and are reported as follows:

TABLE 4

| Example | Tensile Strength (MPa) | Tensile Modulus (MPa) | Percent Elongation at Break (%) |
| --- | --- | --- | --- |
| 1 | 20 | 1000 | 3 |
| 2 | 7 | 300 | 6 |
| 3 | 16 | 600 | 8 |
| 4 | 8 | 425 | 1 |
| 5 | 11 | 175 | 31 |
| 6 | 10 | 380 | 4 |
| 7 | 8 | 145 | 24 |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method comprising:
   providing a powder composition; and
   selectively laser sintering the powder composition to form a three-dimensional article,
   wherein the powder composition comprises at least one laser-sinterable polymer powder, and at least 3 weight percent of reinforcing particles having an aspect ratio of at least 5:1and a maximum dimension of less than 300 microns, based on the total weight of the powder composition,
   wherein at least a portion of the reinforcing particles are mineral particles that form at least 1 weight percent of the powder composition, based on the total weight of the powder composition, and
   wherein at least some of the reinforcing particles are acicular.

2. The method of claim 1, wherein the mineral particles form at least 3 weight percent of the powder composition, based on the total weight of the powder composition.

3. The method of claim 1, wherein the reinforcing particles have an aspect ratio of at least 20:1.

4. The method of claim 1, wherein the mineral particles comprise a silicate.

5. The method of claim 1, wherein the mineral particles comprise wollastonite.

6. The method of claim 1, wherein the reinforcing particles have a maximum dimension of greater than 10 microns.

7. The method of claim 1, wherein the at least one laser-sinterable polymer powder comprises a polyester and a polyamide, a polyolefin, a polyetherketone, a polyurethane, a polyvinyl alcohol, a polyether, a polyvinyl acetate, a polymethacrylate, a phenolic, an ionomer, a polyacetal, an acrylonitrile-butadiene-styrene copolymer, a polyimide, a polycarbonate, or a mixture thereof.

8. The method of claim 7, wherein the at least one laser-sinterable polymer powder comprises a polyamide.

9. The method of claim 8, wherein the mineral particles comprise wollastonite.

10. The method of claim 1, wherein the powder composition is laser sintered to form a test specimen, and the reinforcing particles are present in an amount sufficient to increase the heat deflection temperature in accordance with Method A of ISO 75-2:2004 of the test specimen by at least 10° C. relative to a reference test specimen produced by laser sintering the at least one polymer powder in the absence of the reinforcing particles.

11. The method of claim 1, wherein, when the powder composition is laser sintered to form a test specimen, the test specimen has a heat deflection temperature in accordance with Method A of ISO 75-2:2004 of at least 130° C.

12. The method of claim 1, wherein, when the powder composition is laser sintered to form a test specimen, the test specimen has a tensile strength in accordance with ISO 527 of at least 40 MPa.

13. The method of claim 1, wherein providing the powder composition comprises
   melt blending:
      the reinforcing particles, and
      the at least one polymer powder or pellets containing the material of the at least one polymer powder; and
   forming the powder composition from the resulting blend.

14. A three-dimensional article prepared by the method of claim 1.

* * * * *